UNITED STATES PATENT OFFICE.

WILLIAM L. RAHT, OF BALTIMORE, MARYLAND.

IMPROVEMENT IN TREATING METALLIFEROUS ORES.

Specification forming part of Letters Patent No. 57,376, dated August 21, 1866.

*To all whom it may concern:*

Be it known that I, WILLIAM L. RAHT, of Baltimore, in the county of Baltimore and State of Maryland, have invented a new and useful Improvement in Treating Ores; and I do hereby declare that the following is a full, clear, and exact description thereof, which will enable others skilled in the art to make and use the same.

This invention relates to a new process for treating mat or regulus run from metalliferous ores containing sulphur, arsenic, or antimony; and the invention consists in forcing atmospheric air or other gas through the liquid fused mat obtained from such ores in such a manner that by such air or gases the sulphur, arsenic, or antimony contained in the mat is vaporized, and a pure metal is obtained.

In the usual process of treating ores of copper, nickel, lead, silver, gold, &c. in short, all metalliferous ores containing sulphur, arsenic, or antimony—the surface only of the melted mass is exposed to the air or other gases, and it is obviously very difficult, and in fact impossible, to reach by this process all the sulphur, arsenic, or antimony which may be mixed with said melted mass.

In my process this difficulty is obviated. I force the air or gases through the melted mass in a similar manner to Bessemer's process in treating iron, and thereby said air or gases are disseminated throughout the entire mass, and every particle of sulphur, arsenic, or antimony is reached and expelled.

I do not claim, broadly, as my invention to pass air or gases through metalliferous ores when the same are in a melted state, as this process is described in Bessemer's patents for treating iron ore; but

What I claim as new, and desire to secure by Letters Patent, is—

The within-described process of expelling from metalliferous ores sulphur, arsenic, or antimony by treating the mat or regulus run from such ores in the manner set forth.

The above specification of my invention signed by me this 3d day of March, 1866.

W.M. L. RAHT.

Witnesses:
M. M. LIVINGSTON,
W. HAUFF.